United States Patent
Collett et al.

(10) Patent No.: US 11,186,054 B2
(45) Date of Patent: Nov. 30, 2021

(54) VARIABLE THICKNESS SIPES

(71) Applicants: Mark Collett, Simpsonville, SC (US); Francois Hottebart, Royat (FR); Constantin Lazar, Greenville, SC (US); Martin Lipham, Greenville, SC (US)

(72) Inventors: Mark Collett, Simpsonville, SC (US); Francois Hottebart, Royat (FR); Constantin Lazar, Greenville, SC (US); Martin Lipham, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 456 days.

(21) Appl. No.: 15/764,746

(22) PCT Filed: Sep. 30, 2016

(86) PCT No.: PCT/US2016/054773
§ 371 (c)(1),
(2) Date: Mar. 29, 2018

(87) PCT Pub. No.: WO2017/059247
PCT Pub. Date: Apr. 6, 2017

(65) Prior Publication Data
US 2018/0281328 A1    Oct. 4, 2018

(30) Foreign Application Priority Data
Sep. 30, 2015 (WO) .............. PCT/US2015/053349

(51) Int. Cl.
*B60C 11/12* (2006.01)
*B29D 30/06* (2006.01)
*B60C 11/11* (2006.01)

(52) U.S. Cl.
CPC ...... *B29D 30/0606* (2013.01); *B60C 11/1218* (2013.01); *B60C 11/1281* (2013.01);
(Continued)

(58) Field of Classification Search
CPC ............. B60C 11/1218; B60C 11/1281; B60C 2011/1213; B60C 2011/1277; B29D 2030/0613
See application file for complete search history.

(56) References Cited

U.S. PATENT DOCUMENTS

| | | | |
|---|---|---|---|
| 1,413,190 | A | 4/1922 | Rapson |
| 1,509,259 | A | 9/1924 | Rett et al. |

(Continued)

FOREIGN PATENT DOCUMENTS

| | | |
|---|---|---|
| CN | 1706629 A | 12/2005 |
| CN | 101045285 A | 10/2007 |

(Continued)

OTHER PUBLICATIONS

Machine translation for Japan 2005-170308 (Year: 2021).*
(Continued)

*Primary Examiner* — Steven D Maki
(74) *Attorney, Agent, or Firm* — Hahn Loeser & Parks LLP; Bret A. Hrivnak

(57) ABSTRACT

The present invention includes tire treads having a sipe (18) and a void feature (22) in fluid communication with the sipe. Particular embodiments of the present invention also include methods for forming the same. In various embodiments, the sipe has a length, a height, and a thickness that is variable across the length and height of the sipe. The thickness of the sipe includes a thick portion (24) and a thin portion (26), the thick portion at least partially extending around a perimeter of the thin portion. In particular embodiments, the void feature (22) which is in fluid communication with the sipe (Continued)

extends primarily in a direction of the sipe length and has a width extending in the direction of the sipe thickness equal to or greater than substantially 1 millimeter.

16 Claims, 3 Drawing Sheets

(52) U.S. Cl.
CPC ....... *B29D 2030/0613* (2013.01); *B60C 11/11* (2013.01); *B60C 2011/1209* (2013.01); *B60C 2011/1213* (2013.01); *B60C 2011/1277* (2013.01)

(56) References Cited

U.S. PATENT DOCUMENTS

| | | | |
|---|---|---|---|
| 2,121,871 A | 6/1938 | Havens | |
| 2,121,955 A | 6/1938 | Ernst | |
| 2,264,767 A | 12/1941 | Ofensend | |
| 2,327,057 A | 8/1943 | Ofensend | |
| 2,637,362 A | 5/1953 | Briscoe et al. | |
| 2,696,863 A | 12/1954 | Ewart et al. | |
| 2,732,589 A | 1/1956 | Steadman | |
| 3,115,919 A | 12/1963 | Roberts | |
| 3,373,790 A | 3/1968 | Newman et al. | |
| 3,608,602 A | 9/1971 | Youngblood | |
| 3,653,422 A | 4/1972 | French | |
| 3,770,040 A | 11/1973 | De Cicco | |
| 3,945,417 A | 3/1976 | Harrelson, Jr. | |
| 3,998,256 A | 12/1976 | Verdier | |
| 4,254,811 A | 3/1981 | Devaux | |
| 4,515,197 A | 5/1985 | Motomura et al. | |
| 4,574,856 A | 3/1986 | Graas | |
| 4,703,787 A | 11/1987 | Ghilardi | |
| 4,723,584 A | 2/1988 | Yamaguchi et al. | |
| 4,794,965 A | 1/1989 | Lagnier | |
| 4,832,099 A | 5/1989 | Matsumoto | |
| 4,994,126 A | 2/1991 | Lagnier | |
| 5,031,680 A | 7/1991 | Kajikawa et al. | |
| 5,248,357 A | 9/1993 | Miyanaga et al. | |
| 5,316,063 A | 5/1994 | Lagnier | |
| 5,342,462 A | 8/1994 | King et al. | |
| 5,445,691 A | 8/1995 | Nakayama et al. | |
| 5,503,207 A | 4/1996 | Ochiai et al. | |
| 5,535,798 A | 7/1996 | Nakamura | |
| 5,769,977 A | 6/1998 | Masaoka | |
| 5,783,002 A | 7/1998 | Lagnier | |
| 5,804,000 A | 9/1998 | Shirai et al. | |
| 6,012,499 A | 1/2000 | Masaoka | |
| 6,102,092 A | 8/2000 | Radulescu | |
| 6,116,310 A * | 9/2000 | Shinohara ............... | B60C 11/12 152/209.21 |
| 6,123,130 A | 9/2000 | Himuro et al. | |
| 6,143,223 A | 11/2000 | Merino Lopez | |
| 6,196,288 B1 | 3/2001 | Radulescu et al. | |
| 6,264,453 B1 | 7/2001 | Jacobs et al. | |
| 6,315,018 B1 | 11/2001 | Watanabe | |
| 6,382,283 B1 | 5/2002 | Caretta | |
| 6,408,910 B1 | 6/2002 | Lagnier et al. | |
| 6,412,531 B1 | 7/2002 | Janajreh | |
| 6,439,284 B1 | 8/2002 | Fontaine | |
| 6,443,200 B1 | 9/2002 | Lopez | |
| 6,461,135 B1 | 10/2002 | Lagnier et al. | |
| 6,467,517 B1 | 10/2002 | Radulescu | |
| 6,668,885 B2 | 12/2003 | Ishiyama | |
| 6,668,886 B1 | 12/2003 | Iwamura | |
| 6,761,197 B2 | 7/2004 | Carra et al. | |
| 6,776,204 B2 | 8/2004 | Cesarini et al. | |
| 6,799,616 B2 | 10/2004 | Himuro | |
| 7,017,634 B2 | 3/2006 | Radulescu et al. | |
| 7,143,799 B2 | 12/2006 | Collette et al. | |
| 7,249,620 B2 | 7/2007 | Croissant et al. | |
| 7,338,269 B2 | 3/2008 | Delbet et al. | |
| 7,507,078 B2 | 3/2009 | Nguyen et al. | |
| 7,793,692 B2 | 9/2010 | Nguyen et al. | |
| 8,267,679 B2 | 9/2012 | Cuny et al. | |
| 8,276,629 B2 | 10/2012 | Bonhomme | |
| 8,393,365 B2 | 3/2013 | Janesh et al. | |
| 9,022,083 B2 | 5/2015 | Voss et al. | |
| 9,387,728 B2 | 7/2016 | Warfford et al. | |
| 9,434,214 B2 | 9/2016 | Iwamura | |
| 9,981,507 B2 | 5/2018 | Warfford et al. | |
| 2002/0033214 A1 | 3/2002 | Carra et al. | |
| 2002/0142056 A1 | 10/2002 | Aperce et al. | |
| 2002/0144762 A1 | 10/2002 | Peda et al. | |
| 2003/0029537 A1 * | 2/2003 | Iwamura ................. | B60C 11/12 152/209.18 |
| 2005/0081972 A1 | 4/2005 | Lopez | |
| 2005/0121124 A1 | 6/2005 | Tsubono | |
| 2005/0183807 A1 | 8/2005 | Hildebrand | |
| 2006/0027295 A1 | 2/2006 | Knispel et al. | |
| 2006/0088618 A1 | 4/2006 | Radulescu et al. | |
| 2007/0084534 A1 | 4/2007 | Byrne | |
| 2007/0095447 A1 | 5/2007 | Nguyen et al. | |
| 2007/0199634 A1 | 8/2007 | Sakamaki | |
| 2007/0295434 A1 | 12/2007 | Nguyen et al. | |
| 2008/0029193 A1 * | 2/2008 | Perrin ..................... | B60C 11/12 152/209.18 |
| 2008/0128062 A1 | 6/2008 | Lopez | |
| 2008/0152745 A1 | 6/2008 | Nguyen et al. | |
| 2008/0163970 A1 | 7/2008 | Ohara | |
| 2009/0065115 A1 | 3/2009 | Mathews | |
| 2009/0159167 A1 | 6/2009 | Scheuren | |
| 2009/0218020 A1 * | 9/2009 | Sumi ....................... | B60C 11/12 152/209.18 |
| 2009/0301622 A1 | 12/2009 | Brown | |
| 2010/0243119 A1 | 9/2010 | Miyazaki | |
| 2010/0300626 A1 | 12/2010 | Nguyen et al. | |
| 2011/0017374 A1 | 1/2011 | Bervas et al. | |
| 2011/0100519 A1 * | 5/2011 | Yamakawa ......... | B60C 11/1218 152/209.18 |
| 2011/0120610 A1 | 5/2011 | Fugier et al. | |
| 2011/0265926 A1 | 11/2011 | De Staercke | |
| 2011/0277898 A1 | 11/2011 | Barraud et al. | |
| 2012/0048439 A1 | 3/2012 | Christenbury | |
| 2013/0014873 A1 | 1/2013 | Voss et al. | |
| 2013/0164401 A1 | 6/2013 | Dusseaux | |
| 2014/0060717 A1 | 3/2014 | Morgan et al. | |
| 2014/0166173 A1 * | 6/2014 | Dayet .................. | B60C 11/1263 152/209.25 |
| 2014/0261936 A1 | 9/2014 | Iwamura | |
| 2015/0053320 A1 | 2/2015 | Mathonet et al. | |
| 2015/0059943 A1 * | 3/2015 | Radulescu .............. | B60C 11/04 152/209.17 |
| 2015/0251499 A1 | 9/2015 | Jin et al. | |
| 2016/0325590 A1 | 11/2016 | Moser et al. | |
| 2017/0021675 A1 | 1/2017 | Kose et al. | |
| 2017/0225517 A1 * | 8/2017 | Lawson ............... | B60C 11/1259 |
| 2017/0246820 A1 | 8/2017 | Lawson | |
| 2018/0272637 A1 | 9/2018 | Lawson et al. | |
| 2019/0054774 A1 | 2/2019 | Kose et al. | |

FOREIGN PATENT DOCUMENTS

| | | |
|---|---|---|
| CN | 101148020 A | 3/2008 |
| CN | 104044406 A | 9/2014 |
| DE | 2024279 A1 | 3/1971 |
| DE | 19506697 A1 | 8/1996 |
| DE | 102006010050 A1 | 9/2007 |
| EP | 540340 A2 | 5/1993 |
| EP | 721853 A1 | 7/1996 |
| EP | 925907 A1 | 6/1999 |
| EP | 1125709 A1 | 8/2001 |
| EP | 1170153 A1 | 1/2002 |
| EP | 1243390 B1 | 9/2002 |
| EP | 1782970 A1 | 5/2007 |
| EP | 1920951 A1 | 5/2008 |
| EP | 1935671 A2 | 6/2008 |
| EP | 1938939 A1 | 7/2008 |
| EP | 2376297 B1 | 10/2012 |
| EP | 2570273 A1 | 3/2013 |
| FR | 2730951 A1 | 8/1996 |

(56) References Cited

FOREIGN PATENT DOCUMENTS

| | | | |
|---|---|---|---|
| FR | 2909588 A1 | 6/2008 | |
| FR | 2950565 A1 | 4/2011 | |
| FR | 2971732 A1 | 8/2012 | |
| GB | 474588 A | 11/1937 | |
| GB | 2061837 A | 5/1981 | |
| JP | 62268707 A | 11/1987 | |
| JP | 02060805 A | 3/1990 | |
| JP | 02-303908 A | * | 12/1990 |
| JP | 02303908 A | 12/1990 | |
| JP | 02310108 A | 12/1990 | |
| JP | 2310108 A | 12/1990 | |
| JP | 03090317 A | 4/1991 | |
| JP | 03112705 A | 5/1991 | |
| JP | 03189112 A | 8/1991 | |
| JP | 03279006 A | 10/1991 | |
| JP | 05169913 A | 7/1993 | |
| JP | 5338412 A | 12/1993 | |
| JP | 2000102925 A | 4/2000 | |
| JP | 2001063323 A | 3/2001 | |
| JP | 2001130227 A | 5/2001 | |
| JP | 2002501458 A | 1/2002 | |
| JP | 2003182314 A | 7/2003 | |
| JP | 2003211922 A | 7/2003 | |
| JP | 2004009886 A | 1/2004 | |
| JP | 2005104194 A | 4/2005 | |
| JP | 2005-170308 A | * | 6/2005 |
| JP | 2005262973 A | 9/2005 | |
| JP | 2006051863 A | 2/2006 | |
| WO | 9948707 A1 | 9/1999 | |
| WO | 0238399 A2 | 5/2002 | |
| WO | 2007028438 A1 | 3/2007 | |
| WO | 2010030276 A1 | 3/2010 | |
| WO | 2010039148 A1 | 4/2010 | |
| WO | 2010072523 A1 | 7/2010 | |
| WO | 2011062595 A1 | 5/2011 | |
| WO | 2012058171 A1 | 5/2012 | |
| WO | 2013011335 A1 | 1/2013 | |
| WO | 2015030101 A1 | 3/2015 | |
| WO | 2015080771 A1 | 6/2015 | |
| WO | 2015080772 A1 | 6/2015 | |
| WO | 2015080799 A1 | 6/2015 | |
| WO | 2016053307 A1 | 4/2016 | |
| WO | 2016088622 A1 | 6/2016 | |
| WO | 2017059233 A1 | 4/2017 | |

OTHER PUBLICATIONS

Translation for Japan 02-303908 (Year: 2021).*
PCT/US2016/064268—International Search Report and Written Opinion dated Jul. 28, 2017, 14 pages.
PCT/US2017/063997—International Search Report and Written Opinion dated Feb. 16, 2018, 13 pages.
International Search Report w Written Opinion for PCT/US2015/053349 dated Jun. 27, 2016.
International Search Report w Written Opinion for PCT/US2016/054773 dated Dec. 15, 2016.

* cited by examiner

VARIABLE THICKNESS SIPES

CROSS-REFERENCE TO RELATED APPLICATIONS

This application claims priority to International Application No. PCT/US2015/053349, filed Sep. 30, 2015 with the U.S. Patent Office (acting as a Receiving Office), and which is hereby incorporated by reference.

BACKGROUND OF THE INVENTION

Field of the Invention

This invention relates generally to tire treads, and more particularly, to tire treads having sipes, where at least a portion of the sipe has a reduced thickness.

Description of the Related Art

Tire treads are known to include a pattern of voids and/or discontinuities such arranged along a ground-engaging side of the tread to provide sufficient traction and handling during particular conditions. For example, grooves provide voids into which water, mud, or other environmental materials may be diverted to better allow the tread surface to engage a ground surface. By providing the pattern of voids/discontinuities, tread elements are formed along the tread, where the outer portion of said elements are arranged along the outer side of the tread to provide traction as the outer side engages the ground surface (that is, a surface upon with the tire operates, which is also referred to herein as a tire operating surface).

It is well known that the tire tread wears during tire operation due to the generation of slip between the outer side of the tread and the tire operating surface. This not only occurs when the rolling direction of the tire is biased relative to the direction of vehicle travel to generate lateral traction forces, such as when a vehicle is changing direction during turning or cornering maneuvers, but also when the vehicle is traveling in a straight line.

In certain instances, it is advantageous to employ sipes, which are narrow voids or slits that generally close at some instance within a tire's footprint, which is the area of contact between the tire and the tire operating surface. For example, sipes can offer benefits in traction, such as in snow. Sipe, however, can reduce the stiffness of a tire tread, resulting in undesired tread wear. Therefore, there is a need to reduce the occurrence of wear when employing the use of sipes in tire treads.

SUMMARY OF THE INVENTION

Particular embodiments of the present invention include tire treads having a sipe and a void feature in fluid communication with the sipe. Particular embodiments of the present invention also include methods for forming the same.

Particular embodiments of a tire tread having a sipe and a void feature in fluid communication with the sipe include a tire tread comprising a length extending in a lengthwise direction, the lengthwise direction being a circumferential direction when the tread is arranged on a tire, a width extending in a lateral direction, the lateral direction being perpendicular to the lengthwise direction a thickness extending in a depthwise direction from an outer, ground-engaging side of the tread, the depthwise direction being perpendicular to both the lengthwise direction and the widthwise direction of the tread. The sipe has a length, a height, and a thickness that is variable across the length and height of the sipe. The thickness of the sipe includes a thick portion and a thin portion, the thick portion at least partially extending around a perimeter of the thin portion. In certain instances, where the thin portion forms at least 40% of the surface area along each of the opposing sides of the sipe, the opposing sides are arranged on opposing sides of the sipe thickness. In various embodiments, the thickness of the sipe, including the thick portion and the thin portion of the thickness, undulates back and forth in a direction of the sipe thickness as the sipe extends in a direction of the sipe height or width to form a plurality of undulations. The void feature is in fluid connection with the sipe. In particular embodiments, the void feature extends primarily in a direction of the sipe length and has a width extending in the direction of the sipe thickness equal to or greater than substantially 1 millimeter.

The foregoing and other embodiments, objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

The present invention includes methods for forming a tire tread, tire treads, and tires including said treads, where any such tread includes one or more sipes having a variable thickness, the variable thickness including a thick portion and a thin portion, the thick portion at least partially extending around a perimeter of the thin portion, and where the thin portion forms at least 40% of the surface area along each of the opposing sides of the sipe, the opposing sides being arranged on opposing sides of the sipe thickness. In providing one or more sipes, it is understood that one sipe or a plurality of sipes may be provided in any tread. Any such tread also includes a void feature in fluid connection with the sipe, the void feature extending primarily in a direction of the sipe length and having a width extending in the direction of the sipe thickness equal to or greater than substantially 1 millimeter. By virtue of employing such treads, reduced tread wear is able to be achieved while also continuing to obtain tire/vehicle performance benefits commonly achieved utilizing one or more of such sipes.

Figure 1:
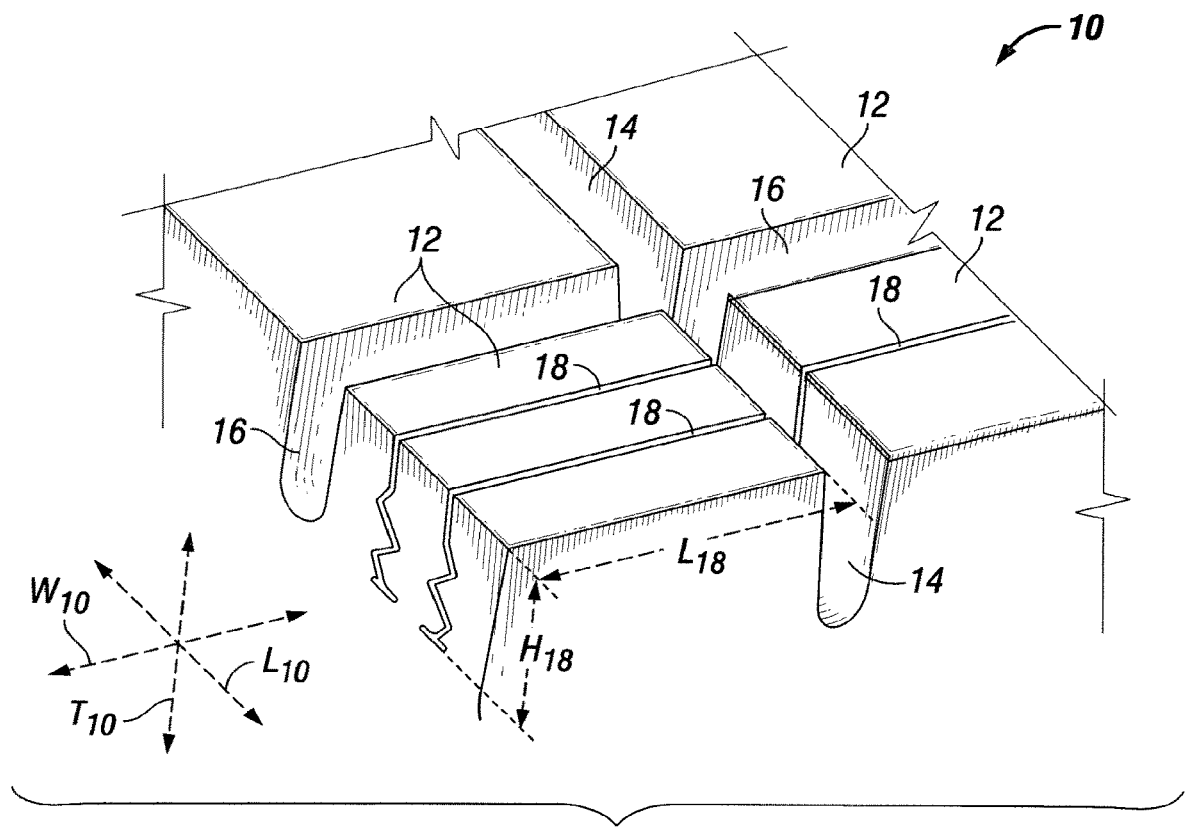
FIG. 1 is a partial perspective view of a tire tread showing a plurality of tread blocks separated by lateral and longitudinal grooves, the longitudinal grooves, where the tread blocks include one or more sipes, in accordance with an embodiment of the invention.

With regard to the tire treads described herein, having the noted one or more sipes and a void feature in fluid connection with each of the one or more sipes, it is appreciated that each such tread includes a length, width, and thickness. The length extends in a lengthwise direction. As the tread may be formed with the tire, or separately for later installation on the tire, such as during retreading operations, for example, the lengthwise direction of the tread is a circumferential (that is, annular) direction when the tread is arranged on a tire. The width extends in a lateral direction, the lateral direction being perpendicular to the lengthwise direction, while the thickness extends in a depthwise direction from an outer, ground-engaging side of the tread, the depthwise direction being perpendicular to both the lengthwise direction and the widthwise direction of the tread. By way of example, an exemplary tire tread is partially shown in FIGS. 1 and 2, where tire tread 10 includes a plurality of tread blocks 12 separated by longitudinal grooves 14 and lateral grooves 16. The tire tread extends in directions of the tread length $L_{10}$, tread width $W_{10}$, and tread thickness $T_{10}$. Each tread block 12 includes one or more sipes 18 each having a length $L_{18}$ extending at least partially in a direction of the tread width $W_{10}$, a height $H_{18}$ extending at least partially in a direction of the tread depth $T_{10}$ and perpendicular to the tread length, and a thickness $T_{18}$. As best seen in FIG. 1, each sipe 18 is arranged between opposing sides or surfaces 16 of the tread within the tread thickness. It is noted that the pair of sipes 18 arranged in one tread block are arranged in an S-Z relationship, where opposing undulations between the adjacent sipes undulate in opposing directions, either towards or away from one another, while in other embodiments, a Z-Z relationship may be employed, where opposing undulations between the adjacent sipes undulate in the same direction (are parallel with one another). Of course any other desired sipe design may be employed independent or in cooperation with any other sipe employed in the tread.

With specific regard to the sipes, as noted above, particular embodiments of such tire treads include a sipe having a length, a height, and a thickness that is variable across the length and height of the sipe. The variableness in the thickness is at least provided by the thickness including a thick portion and a thin portion, the thick portion at least partially extending around a perimeter of the thin portion. Of course, the thin portion is thinner than the thick portion. For example, in certain embodiments, the thick portion is at least 0.4 millimeters (mm) thick and the thin portion less than 0.4 mm thick. In particular variations, the thin portion is 0.2 mm or less thick or 0.15 mm or less thick. In certain embodiments, the thick portion extends substantially along 2 sides of the thin portion, 50% around the thin portion, substantially along 3 sides of the thin portion, at least 75% around the thin portion, or substantially around the thinner portion. It is appreciated that one or more thick and thin portions may be arranged within any sipe described or contemplated herein. For example, a sipe may include a pair of thin portions sharing a common thick portion arranged between the pair of thick portions. By further example, a sipe may include multiple pairs of thick and thin portions spaced apart along the sipe. By virtue of providing a thick portion around at least a portion of the thin portion, the additional mass provides strength and stiffness permitting the thinner portion to exist in a member for molding the sipe (referred to as a sipe-molding member), as the thin portion is better able to withstand the demolding forces that arise when a tire tread (which may or may not form a portion of a tire, as a tread can be molded separate from a tire, such as for producing a tread for tire retreading operations) is demolded from the sipe-molding member). In particular embodiments, the thin portion forms at least 40% of the surface area along or defining each of the opposing sides of the sipe, the opposing sides being arranged on opposing sides of the sipe thickness. In other embodiments, the thin portion forms upwards of 95% of the surface area along or defining each of the opposing sides of the sipe.

Figure 3:
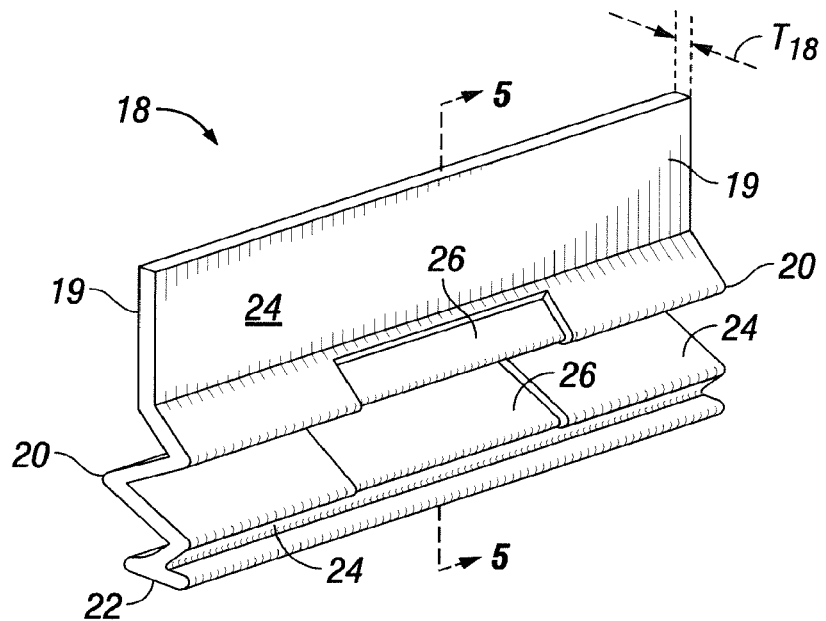
FIG. 3 is a perspective view of a sipe shown in FIGS. 1 and 2, but which also represents a sipe-molding element for use in forming the sipe, in accordance with a particular embodiment of the invention.
Figure 4:
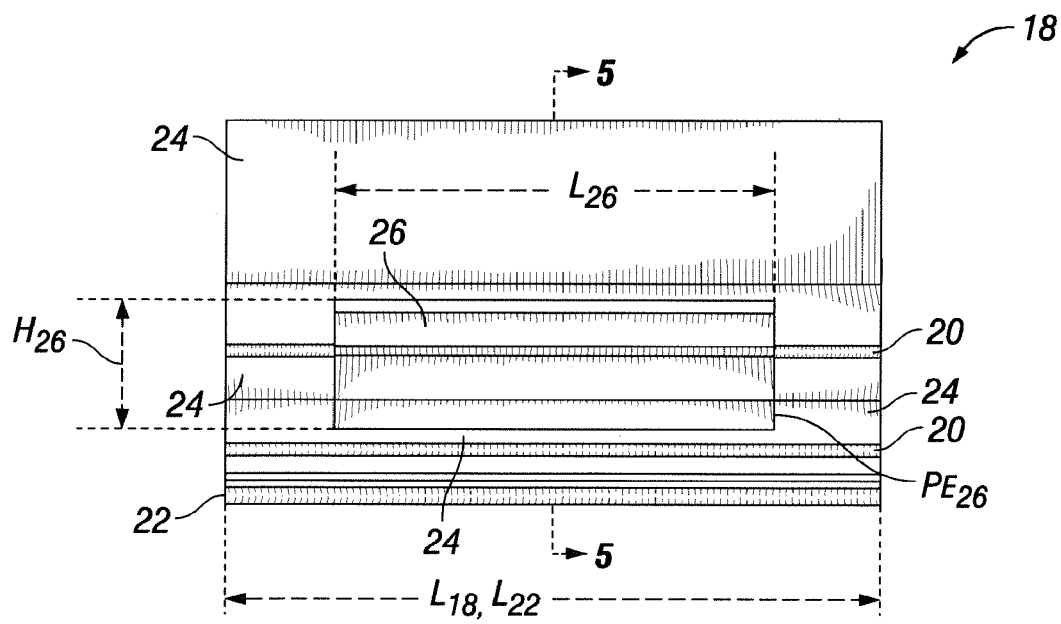
FIG. 4 is a front view of a sipe-molding element for use in forming a sipe shown in FIG. 2, in accordance with a particular embodiment of the invention.
Figure 5:
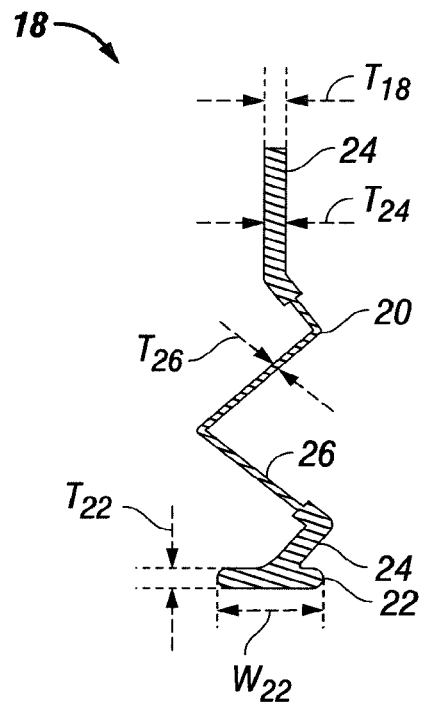
FIG. 5 is a sectional view of the sipe-molding element shown in FIG. 4, taken along line 5-5.

With reference to FIGS. 3-5, an exemplary embodiment of a sipe 18 is shown. In particular, sipe 18 is shown to have a variable thickness $T_{18}$ extending in the direction of the length and height of the sipe. The variableness in the thickness is at least provided by a thick portion 24 and a thin portion 26 of thickness $T_{18}$, the thick portion at least partially extending around a perimeter $PE_{26}$ of the thin portion. Of course, the thin portion 26 has a thickness $T_{26}$ that is less than a thickness $T_{24}$ of the thick portion 24. It is apparent in FIGS. 3-5 that thick portion 24 completely surrounds thin portion 26 along perimeter $PE_{26}$. It is also apparent that the thick and thin portions 24, 26 are arranged along an undulating portion of the sipe, as undulations 20 (discussed further below) extend through the thick and thin portions.

To provide additional strength and stiffness to the sipe-molding member, the sipe-molding member is configured to form an undulating sipe, whereby the thickness of the sipe, and therefore the thickness of the sipe-molding member, undulates back and forth in a direction of the sipe thickness as the sipe extends in a direction of the sipe height or width to form a plurality of undulations. In certain embodiments, the thickness undulating back and forth includes the thick portion and the thin portion of the thickness. In addition to undulating in a single direction as previously discussed, in certain variations, the thickness undulates in one or more additional direction. For example, while the thickness of the sipe, and therefore the thickness of the sipe-molding member, undulates back and forth in a direction of the sipe thickness as the sipe extends in a direction of the sipe height to form a plurality of undulations, the thickness of the sipe, and therefore the thickness of the sipe-molding member, also undulates back and forth in the direction of the sipe thickness as the sipe extends in a direction other than the sipe length, such as in a direction of the sipe width. When it is said that the thickness undulates back and forth in a direction of the sipe thickness as the sipe extends in a particular direction, what is meant is that the thickness of the sipe undulates along a path that undulates back and forth in a direction of the sipe thickness while the path also extends in another direction, such as in a direction of the sipe height or width. It is appreciated that the undulations or undulating path may be curvilinear or formed of a plurality of line segments, such as when forming a stepped or zig-zag path. In particular embodiments, the plurality of undulations are spaced apart by a distance of 3.5 millimeters or less, while the amplitude or height of each of the plurality of undulations is at least 2 millimeters.

Figure 2:
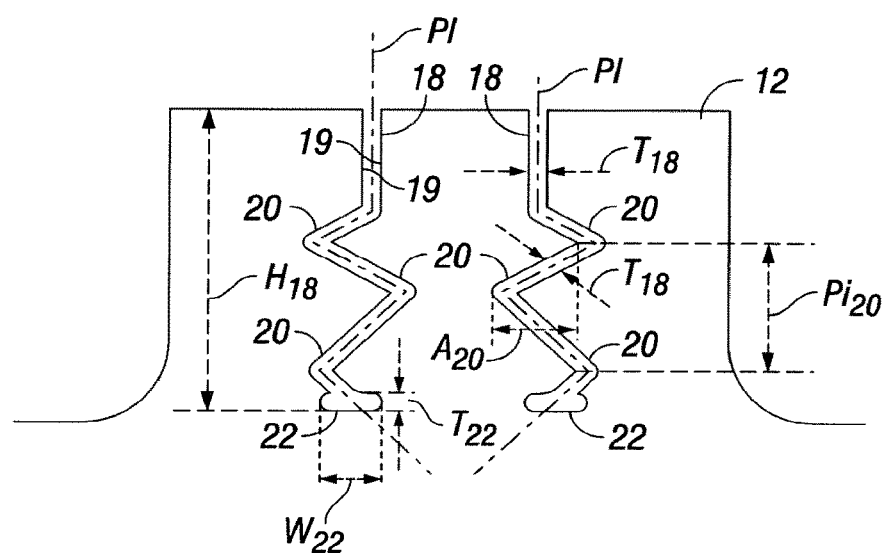
FIG. 2 is a side view of a particular tread block of the tread shown in FIG. 1, showing a pair of sipes contained in the tread block in a side view.
Figure 6:
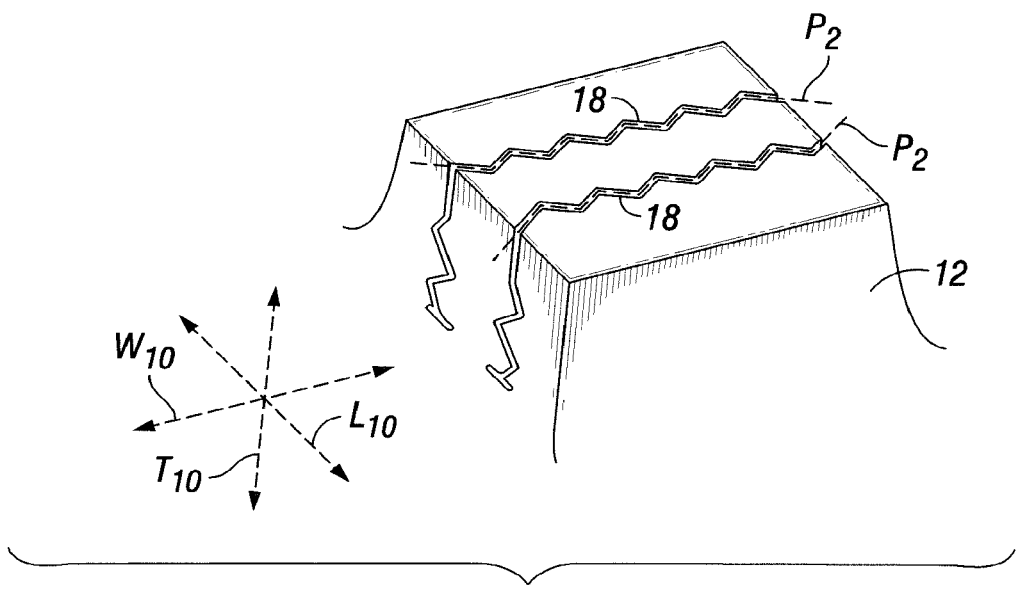
FIG. 6 is a perspective view of a tread block including a pair of sipes, each sipe extending both in a direction of the tread thickness and of the tread width along undulating paths, in accordance with another embodiment of the invention.

By example, With reference to the exemplary embodiment shown in FIGS. 1-5, sipes 18 are shown to have a thickness $T_{18}$ that undulates back and forth in a direction of the sipe thickness as the sipe extends in a direction of the sipe height $H_{18}$ to form a plurality of undulations 20. With specific regard to FIG. 2, it can be seen that the thickness undulates back and forth in a direction of the sipe thickness as the sipe extends along path P1, which undulates back and forth in a direction of the sipe thickness $T_{18}$ while the path also extends in a direction of the sipe height $H_{18}$. With reference to another exemplary embodiment shown in FIG. 6, each sipe 18 and sipe thickness $T_{18}$ is shown to undulate back and forth in a direction of the tread thickness as the thickness extends in each of a direction of the sipe height $H_{18}$ and a direction of the sipe width $W_{18}$ to form a plurality of undulations 20. Of course, other variations are contemplated as noted herein. Also shown in FIG. 2 is the spacing $Pi_{20}$ between adjacent undulations 20 and undulation amplitude or height $A_{20}$.

Yet further, the sipe-molding member obtains additional strength and stiffness by including a void-molding member to form a void feature in fluid connection with the sipe, the void feature extending primarily in a direction of the sipe length and having a width extending in the direction of the sipe thickness substantially equal to or less than 1 millimeter. The void feature thickness extends perpendicular to the void feature width. In extending primarily in a direction of the sipe length, when separating the average direction of extension into vectors extending in the direction of the sipe length, height, and thickness, the vector extending in the direction of the sipe length is greatest among the different vectors. This void-molding member may be arranged at any location of the sipe-molding member height, although in certain instances, it is arranged outside the thin portion of the sipe thickness and may instead be attached to the thick portion of the sipe thickness, for example. It is appreciated that the void feature may at least span a portion of the thin portion, while in certain instances the void feature at least spans the thin portion of the sipe thickness in a direction of the sipe length. In further variations, the void feature extends substantially the full length of the sipe. It is appreciated that the void-molding member may form a void feature in connection with the sipe of any desired shape of uniform or non-uniform cross-section. For example, the void feature may form a groove of cylindrical or rectangular shape. It is also appreciated that the void feature formed has a length that extends linearly or non-linearly, that is, along any linear or non-linear path.

By way of example, with reference to the embodiments shown in FIGS. 1-6, an exemplary void feature 22 is shown arranged at a terminal end of the sipe. As discussed above, the void features may be arranged otherwise along sipe 18. With specific reference to FIGS. 2 and 5, the void feature 22 has a thickness $T_{22}$ extending perpendicular to a width $W_{22}$ of the void feature. With specific reference to FIG. 4, void feature 22 has a length $L_{22}$. While it is appreciated that the void feature 22 may form a groove, the void feature shown forms a sipe. In the embodiment shown, the void feature thickness $T_{22}$ is 1 mm or less or 0.4 mm or less and the width $W_{22}$ is 1 mm or less. While the length may extend any partial length of sipe 18, the void feature length $L_{22}$ extends the full length $L_{18}$ of sipe 18. It is also shown that void feature 22 at least spans the thin portion 26 of the sipe thickness in a direction of the sipe length $L_{18}$. Length $L_{22}$ also extends linearly and parallel to the lengthwise direction of sipe 18.

It is appreciated that any one or a plurality of the sipes described herein may be molded into a tire tread in a method of forming a tire tread using a like sipe-molding member. In the method, a tire tread has a length, a width, and a thickness as described above. In particular embodiments, the method comprising the step of molding into the tread a sipe and a void feature of any variation described herein. As noted above, a sipe-molding member may take the form of the void to be formed in the tread, such as shown in an exemplary embodiment in FIGS. 3-5. It is appreciated that the thin portion in any sipe-molding member may be formed by any known manner, such as by molding the sipe-molding element to a have a sufficiently thin section, or to remove material from a pre-existing sipe-molding element, such by using a material removal apparatus. Exemplary material removal apparatuses include grinders and abrading devices. Additional steps may include removing the sipe-molding member to provide a like-shaped void.

It is appreciated that any tread discussed herein may be arranged along an annular pneumatic tire, or may be formed separately from a tire as a tire component for later installation on a tire carcass, in accordance with any technique or process known to one of ordinary skill in the art. For example, the treads discussed and referenced herein may be molded with a new, original tire, or may be formed as a retread for later installation upon a used tire carcass during retreading operations. Therefore, when referencing the tire tread, a longitudinal direction of the tire tread is synonymous with a circumferential direction of the tire when the tread is installed on a tire. Likewise, a direction of the tread width is synonymous with an axial direction of the tire or a direction of the tire width when the tread is installed on a tire. Finally, a direction of the tread thickness is synonymous with a radial direction of the tire when the tread is installed on a tire. It is understood that the inventive tread may be employed by any known tire, which may comprise a pneumatic or non-pneumatic tire, for example.

It is appreciated that any of the tread features discussed herein may be formed into a tire tread by any desired method, which may comprise any manual or automated process. For example, the treads may be molded, where any or all discontinuities therein may be molded with the tread or later cut into the tread using any manual or automated process. It is also appreciated that any one or both of the pair of opposing discontinuities may be originally formed along, and in fluid communication with, the outer, ground-engaging side of the tread, or may be submerged below the outer, ground-engaging side of the tread, to later form a tread element after a thickness of the tread has been worn or otherwise removed during the life of the tire.

What is claimed is:

1. A tire tread comprising:
   a length extending in a lengthwise direction, the lengthwise direction being a circumferential direction when the tread is arranged on a tire;
   a width extending in a lateral direction, the lateral direction being perpendicular to the lengthwise direction;
   a thickness extending in a depthwise direction from an outer, ground-engaging side of the tread, the depthwise direction being perpendicular to both the lengthwise direction and the widthwise direction of the tread;
   a sipe having a length, a height, and a thickness that is variable across the length and height of the sipe,
   where the thickness includes a thick portion and a thin portion, the thick portion at least partially extending around a perimeter of the thin portion,
   where the thin portion forms upwards of 95% of the surface area defining each of the opposing sides of the sipe, the opposing sides being arranged on opposing sides of the sipe thickness,
   where the thickness of the sipe, including the thick portion and the thin portion of the thickness, undulates back and forth in a direction of the sipe thickness as the sipe extends in a direction of the sipe height and along a direction of the sipe length to form a plurality of undulations, and a void feature in fluid connection with the sipe, the void feature extending primarily in a direction of the sipe length and having a width extending in the direction of the sipe thickness.

2. The tire tread of claim 1, where, as to the thickness of the sipe, the thick portion is at least 0.4 millimeter thick and the thin portion less than 0.4 mm thick.

3. The tire tread of claim 2, where the thin portion is 0.15 mm or less thick.

4. The tire tread of claim 1, where the void feature is a second sipe, the void feature having a thickness extending perpendicular to a width of the void feature, the thickness of the void feature being 1 mm or less and the width of the void feature being equal to or less than 1 mm.

5. The tire tread of claim 1, where the void feature at least spans the thin portion of the sipe thickness in a direction of the sipe length.

6. The tire tread of claim 4, where the void feature extends substantially the full length of the sipe.

7. The tire tread of claim 1, where each of the plurality of undulations has an amplitude of at least 2 millimeters.

8. The tire tread of claim 1, where the plurality of undulations are spaced apart by a distance of 3.5 millimeters or less.

9. The tire tread of claim 1, comprising:
a second sipe having a length, a height, and a thickness that is variable across the length and height of the second sipe,
where the thickness of the second sipe includes a thick portion and a thin portion, the thick portion at least partially extending around a perimeter of the thin portion,
where the thin portion forms upwards of 95% of the surface area defining each of the opposing sides of the second sipe, the opposing sides being arranged on opposing sides of the second sipe thickness,
where the thickness of the second sipe, including the thick portion and the thin portion of the thickness, undulates back and forth in a direction of the second sipe thickness as the second sipe extends in a direction of the second sipe height and along a direction of the second sipe length to form a plurality of undulations,
where the second sipe is adjacent to the sipe, where the second sipe forms a pair of sipes with the sipe, where the pair of sipes are arranged in a relationship where opposing undulations of each of the sipe and the second sipe undulate in opposing directions to form a S-Z relationship.

10. A tire tread comprising:
a length extending in a lengthwise direction, the lengthwise direction being a circumferential direction when the tread is arranged on a tire;
a width extending in a lateral direction, the lateral direction being perpendicular to the lengthwise direction;
a thickness extending in a depthwise direction from an outer, ground-engaging side of the tread, the depthwise direction being perpendicular to both the lengthwise direction and the widthwise direction of the tread;
a sipe having a length, a height, and a thickness that is variable across the length and height of the sipe,
where the thickness includes a thick portion and a thin portion, the thick portion at least partially extending around a perimeter of the thin portion,
where the thin portion forms upwards of 95% of the surface area defining each of the opposing sides of the sipe, the opposing sides being arranged on opposing sides of the sipe thickness,
where the thickness of the sipe, including the thick portion and the thin portion of the thickness, undulates back and forth in a direction of the sipe thickness as the sipe extends in a direction of the sipe height and along a direction of the sipe length to form a plurality of undulations, and,
a void feature in fluid connection with the sipe, the void feature extending primarily in a direction of the sipe length and having a width extending in the direction of the sipe thickness, where the void feature is a second sipe, the void feature having a thickness extending perpendicular to the width of the void feature, the thickness of the void feature being equal to or less than 1 mm, where the width of the void feature is greater than the thickness of the thick portion.

11. The tire tread of claim 10, where the second sip° thickness of the void feature is equal to or less than 0.4 mm.

12. The tire tread of claim 10, where the void feature extends substantially the full length of the sipe.

13. The tire tread of claim 12, where the void feature extends primarily in the direction of the sipe length along a non-linear path.

14. The tire tread of claim 12, where each of the plurality of undulations has an amplitude of at least 2 millimeters, and where the plurality of undulations are spaced apart by a distance of 3.5 millimeters or less.

15. The tire tread of claim 12, comprising:
an additional sipe having a length, a height, and a thickness that is variable across the length and height of the additional sipe,
where the thickness of the additional sipe includes a thick portion and a thin portion, the thick portion at least partially extending around a perimeter of the thin portion,
where the thin portion forms upwards of 95% of the surface area defining each of the opposing sides of the additional sipe, the opposing sides being arranged on opposing sides of the additional sipe thickness,
where the thickness of the additional sipe, including the thick portion and the thin portion of the thickness, undulates back and forth in a direction of the additional sipe thickness as the additional sipe extends in a direction of the additional sipe height and along a direction of the additional sipe length to form a plurality of undulations,
where the additional sipe is adjacent to the sipe, where the additional sipe forms a pair of sipes with the sipe, where the pair of sipes are arranged in a relationship where opposing undulations of each of the sipe and the additional sipe undulate in opposing directions to form a S-Z relationship.

16. A tire tread comprising:
a length extending in a lengthwise direction, the lengthwise direction being a circumferential direction when the tread is arranged on a tire;
a width extending in a lateral direction, the lateral direction being perpendicular to the lengthwise direction;
a thickness extending in a depthwise direction from an outer, ground-engaging side of the tread, the depthwise direction being perpendicular to both the lengthwise direction and the widthwise direction of the tread;
a sipe having a length, a height, and a thickness that is variable across the length and height of the sipe,
where the thickness includes a thick portion and a thin portion, the thick portion at least partially extending around a perimeter of the thin portion, where the thin portion forms upwards of 95% of the surface area defining each of the opposing sides of the sipe, the opposing sides being arranged on opposing sides of the sipe thickness, where the thickness of the sipe, including the thick portion and the thin portion of the thickness, undulates back and forth in a direction of the sipe thickness as the sipe extends in a direction of the sipe height and along a direction of the sipe length to form a plurality of undulations, and, a void feature in fluid connection with the sipe, the void feature extending primarily in a direction of the sipe length and having a width extending in the direction of the sipe thickness, where the void feature extends primarily in the direction of the sipe length along a non-linear path.

\* \* \* \* \*

UNITED STATES PATENT AND TRADEMARK OFFICE
CERTIFICATE OF CORRECTION

PATENT NO. : 11,186,054 B2
APPLICATION NO. : 15/764746
DATED : November 30, 2021
INVENTOR(S) : Mark Collett et al.

It is certified that error appears in the above-identified patent and that said Letters Patent is hereby corrected as shown below:

In the Claims

Please delete the words "second sip°"" in Claim 11, Column 8, Line 16.

Signed and Sealed this
Fifth Day of July, 2022

Katherine Kelly Vidal
*Director of the United States Patent and Trademark Office*